Patented Oct. 2, 1951

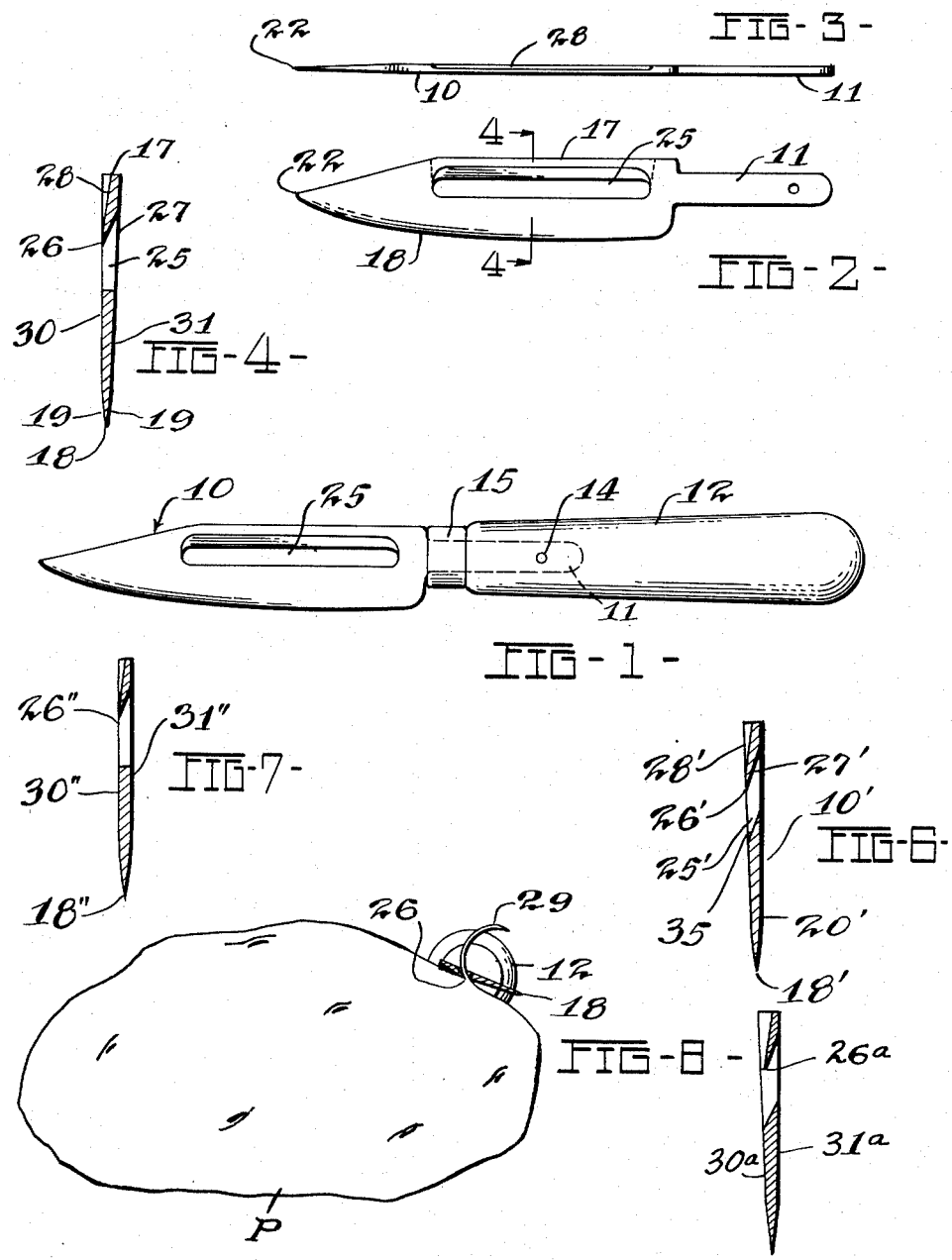

2,570,002

UNITED STATES PATENT OFFICE 2,570,002

PARING KNIFE

Ward McMillen, Toledo, Ohio

Application August 30, 1945, Serial No. 613,678

2 Claims. (Cl. 30—279)

This invention relates to knives and more especially to a paring knife particularly adapted for paring or peeling operations performed upon fruits and vegetables.

The present invention embraces the provision of a paring knife embodying an exterior cutting edge and a second edge spaced from the exterior edge whereby the second cutting edge is particularly adapted for paring or peeling the skin or outer surface from fruits and vegetables.

The invention comprehends the provisions of a cutting instrumentality having a substantially flat blade portion formed with a closed elongated slot in which one of the bounding edges thereof is configurated and sharpened to present a paring edge.

An object of the invention resides in the provision of a knife construction having an exterior edge portion sharpened to a cutting edge and terminating in an apex or point suitable for coring and removing blemishes from fruits and vegetables, the knife being fabricated with a supplemental cutting edge lying within the plane of the knife blade whereby the supplemental edge may be used for paring purposes without interfering with the normal utility of the knife structure when used for slicing or cutting operations in the conventional manner.

Another object of the invention resides in the provision of a substantially flat blade knife having an exterior cutting edge terminating in a point for coring purposes, the knife blade having an elongated closed slot with one of the lengthwise bounding edges thereof sharpened to provide a paring edge disposed substantially in a plane of one side of the knife blade.

Still a further object of the invention resides in a knife implement wherein the structure is adaptable for use as a conventional cutting or slicing knife, as a coring knife, and having a supplemental cutting edge particularly adapted for paring skin or outer surface from fruits and vegetables, the construction being so fabricated as to enable the performance of these several independent functions through the use of a single instrumentality.

Still another object is the provision of a knife having an exterior cutting edge and an interior paring edge wherein such a knife may be inexpensively and quickly manufactured from a single blade or strip of metal or the like.

Figure 1 is a side elevational view of a knife embodying my invention;

Figure 2 is an elevational view of the knife blade per se;

Figure 3 is a top plan view of the construction shown in Figure 2;

Figure 4 is an enlarged transverse sectional view taken substantially on the line 4—4 of Figure 2.

Figure 5 is an elevational view showing the manner in which the knife is used in paring the skin or outer surface of an article;

Figure 6 is a sectional view similar to Figure 4 showing a modified form of knife blade;

Figure 7 is a sectional view similar to Figure 4 illustrating another form of paring blade construction of my invention, and, Figure 8 is a sectional view similar to Figure 6 showing a further modified form of the invention.

While I have illustrated the forms of my invention as particularly adapted as instrumentalities for performing paring operations upon fruits and vegetables or the like, it is to be understood that I contemplate the utilization of the invention for any purposes wherein the same may be found to have utility.

Referring to the drawings in detail the instrumentality of my invention is inclusive of a substantially flat blade or body 10 integrally formed with a rearward extension or tang 11, the latter being provided to facilitate the application of a handle 12, thereto. In the embodiment illustrated, the handle 12 may be of wood or hard rubber suitably secured to the tang 11 by means of a pin 14 or by other means. The handle may be made of other suitable material, as for example, a plastic which if used may be affixed to the tank 11 by a moulding process. As illustrated in Figure 1, the forward portion or neck of the handle 12 may be surrounded by a metal annulus 15 for reinforcing this portion of the handle..

The knife blade is preferably fabricated from substantially flat stock the side walls being slightly tapered from a rear dull or blunt edge 17 toward a cutting edge 18 as shown in Figure 4. The side surfaces or faces of the knife blade adjacent the cutting edge 18 are beveled or converge as at at 19 to form the cutting edge. The cutting edge 18 and the blunt upper edge 17 converge forwardly to provide a pointed portion 22 which is adapted for coring or for removing blemishes from fruits and vegetables, as for example removing the eyes from potatoes.

The body or blade 10 is formed with rectangularly shaped or elongated slot 25, the upper bounding edge being sharpened to a supplemental cutting edge 26 formed by the intersection of the beveled or converging surfaces 27 and 28, as particularly shown in Figure 4. The supplemental cutting edge 26 provides a means for paring the skin or outer surface from fruits or vegetables, Figure 5 illustrating the use of the cutting edge 26 in paring a potato P. The surface 27 is angularly disposed with respect to the plane of the body 10, as particularly shown in Figure 4, to provide ample clearance in the slot 25 to accommodate the paring 29, as shown in Figure 5 the parings passing through the slot 25 during paring operations.

It should be noted that the angularly disposed surfaces 27 and 28 converge in the cutting edge 26 which is disposed in the plane of the surface 30 of the knife blade 10 so that when the knife is used in the conventional manner, that is, when the exterior cutting edge 18 is in use for slicing or any type of conventional cutting, there are no lateral projections or offset portions extending from the knife blade to interfere with such cutting operations. While I have found that for best results it is desirable to form the paring edge 26 in the plane of one of the exterior flat surfaces of the knife body 10, it may be disposed between the planes of the surfaces 30 and 31 of the knife blade without departing from the spirit of the invention. This construction is shown at 26a in Figure 8.

The thickness of a paring 29 from a fruit or vegetable may be varied by the user of the knife simply by changing the angle of approach of surface 30 with respect to the object being pared. It will thus be apparent that the cutting instrumentality or knife of my invention provides the paring configuration especially adapted for rapidly paring fruits or vegetables through the use of the cutting edge 26. The exterior cutting edge 18 may be used for conventional cutting or slicing operations, and the apex or point 22 forming the terminus of the cutting edge 18 is adapted for removing blemishes from fruits and vegetables or the like or for coring, all of which operations may be performed with the single instrumentality of my invention. Thus material saving of time may be made through the use of my invention as it is unnecessary for a person preparing or processing fruits and vegetables to use more than one instrument, as has heretofore been the case with previous paring devices. Moreover the paring knife may be inexpensively manufactured by a blanking operation producing the slot 25 after which the angular surfaces 27 and 28 may be formed by swaging or by metal removing means such as grinding. The knife blade 10 is hardened after it is properly configurated and the cutting edges 18 and 26 sharpened or ground.

Figure 6 illustrates a modified form of the invention wherein the knife body or blade 10' is provided with the converging surfaces 27' and 28' forming at their juncture the supplemental cutting edge 26'. The knife body 10' is also provided with the main or exterior cutting edge 18' for conventional slicing or cutting operations. In this form of blade configuration, the slot 25' is bounded by the angular surface 27' and a substantially parallel surface 35 formed in the body portion 10'. In this form of my invention, the slot 25' provides ample clearance for the paring, and by disposing the surface 35 at an angle to the plane of the knife blade a substantial width or section of metal is afforded for the portion 20', thus giving increased strength to the section 20'. In this form of the invention, the paring is accomplished by utilizing the cutting edge 26' in the same manner as the forms of the invention shown in the other figures.

Figure 7 illustrates a form of blade section similar to Figure 4 wherein the flat blade surface 30'' and 31'' are parallel, these surfaces converging at the lower portion to form the exterior cutting edge 18''. The paring edge 26'' lies in the plane of the surface 30''.

It should be noted that in all forms of the blade structure disclosed, the width of the slot, to a certain degree, controls the thickness of a paring or peeling that is removed from the object being pared. It is to be understood that the slot is to be of such width as to adequately accommodate or permit the passage of a paring or peeling of usual thickness, although the thickness of a paring may be varied to some extent by the user of the knife by changing the angle of approach of the surface 30 in its relation to the object being pared. I have found that for most all paring purposes, a blade provided with a slot having a width from $\frac{5}{32}$ to $\frac{3}{16}$ of an inch has been found to be very satisfactory. However other widths of slot may be used depending upon other special paring purposes for which the knife may be employed without departing from the spirit of the invention.

It is apparent that, within the scope of the invention, modifications and different arrangements may be made other than is herein disclosed, and the present disclosure is illustrative merely, the invention comprehending all variations thereof.

What I claim is:

1. A paring and slicing knife comprising a substantially flat metal knife body having a lower cutting edge for slicing, a handle set in line with said body and rigidly connected thereto, said body having substantially parallel side surfaces and having a closed elongated slot formed therein, said closed slot being of uniform width throughout its length, the upper edge wall of said slot being shaped to form a cutting edge for paring purposes, the rear wall of the section of the body disposed between said slot and the upper edge of the knife body being relieved to form an angularly disposed wall adjacent said slot, the front and rear walls of said section of the body adjacent the slot lying in converging planes angularly disposed with respect to the side surfaces of the knife body.

2. A paring and slicing knife comprising a substantially flat metal knife body having a lower cutting edge for slicing, a handle set in line with said body and rigidly connected thereto, said body having substantially parallel side surfaces and having a closed elongated slot formed therein, the opposed longitudinal walls of said slot being parallel and rectilinear, the upper edge wall of said slot being shaped to form a cutting edge for paring purposes, the rear wall of the section of the body disposed between the slot and the upper edge of the knife body being relieved to form an angularly disposed wall adjacent said slot, the front and rear walls of said section of the body adjacent the slot lying in converging planes angularly disposed with respect to the side surfaces of the knife body.

WARD McMILLEN.

REFERENCES CITED

The following references are of record in the file of this patent:

UNITED STATES PATENTS

| Number | Name | Date |
|---|---|---|
| 1,008,599 | Jaques, Jr. | Nov. 14, 1911 |
| 1,133,213 | Arita | Mar. 23, 1915 |
| 2,240,410 | Murdock | Apr. 29, 1941 |